May 20, 1969 J. M. SCHULTZ 3,445,695
COOLING SYSTEM FOR HERMETIC DYNAMOELECTRIC DEVICES
Filed May 25, 1966
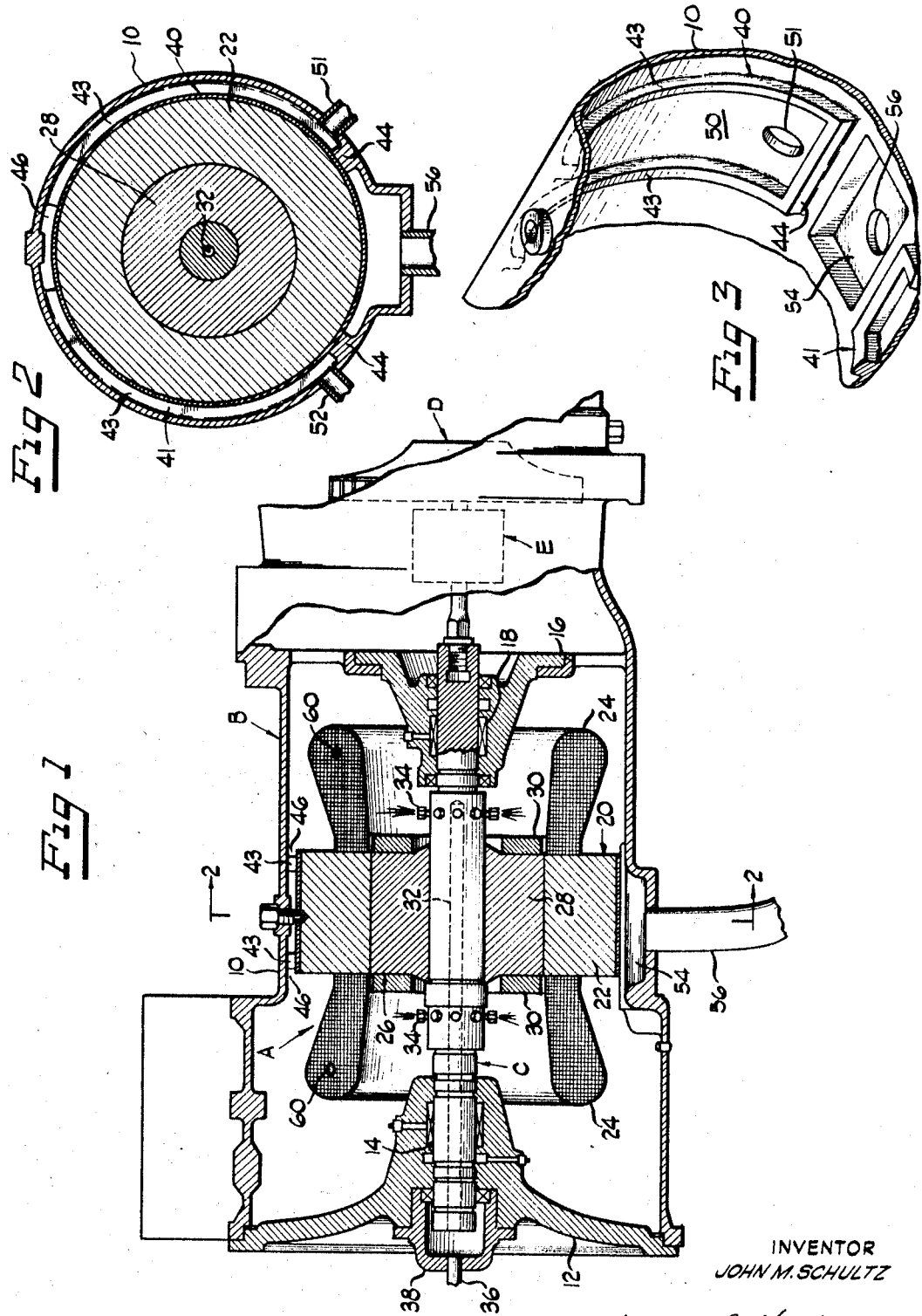
INVENTOR
JOHN M. SCHULTZ
BY Thomas B. Hunter
ATTORNEY United States Patent Office 3,445,695
Patented May 20, 1969

3,445,695
COOLING SYSTEM FOR HERMETIC
DYNAMOELECTRIC DEVICES
John M. Schultz, York, Pa., assignor to Borg-Warner Corporation, Chicago, Ill., a corporation of Illinois
Filed May 25, 1966, Ser. No. 552,747
Int. Cl. H02k 9/19
U.S. Cl. 310—58                                    1 Claim

ABSTRACT OF THE DISCLOSURE

An electric motor assembly is liquid cooled by providing a jacket partially enclosing the stator and arranged so that the liquid spills out over the stator winding end turns. Liquid coolant is also circulated through the rotor shaft and sprayed by nozzles against the internal surfaces of the winding end turns.

*Background and summary of the invention*

This invention relates generally to the cooling of hermetically sealed dynamoelectric devices, such as the electric motors employed in refrigeration compressor drive mechanisms, for example, and more particularly to a liquid coolant supply arrangement which more effectively distributes said coolant over the motor surfaces which are most susceptible to damage by overheating.

In hermetically sealed electric motor drive mechanisms, it is conventional to use an externally supplied, gaseous or liquid coolant to dissipate the heat generated by friction and the resistance of the windings. This is because the rotor and stator in a hermetic unit cannot be exposed to a draft of ambient air which is commonly employed to cool "open" systems.

Effective cooling systems are of critical importance; because if there is insufficient heat transfer, the motor size must be increased to provide more surface area for dissipating the heat generated. If the motor size has to be increased to provide additional sufrace area, it is apparent that this will necessarily increase the weight and the cost thereof, even though additional power may not be required.

Briefly stated, the present invention employs (1) an internal liquid coolant supply with means for spraying, or otherwise directing the coolant over the inner surfaces of the stator end turns, and the ends of the rotor core, and (2) a jacketed stator arrangement to confine a separate supply of the collant along the outside of the stator in a space between said stator core and the housing. The coolant from the jacket then spills out of the upper portion of the jacket over the external surfaces of the stator windings and flows by gravity, along with the sprayed coolant, to a sump underneath the motor. While there are many significant advantages afforded by the invention, the most important is that such excellent cooling is obtained by the novel arrangement to be more particularly described that all parts of the stator winding are kept at a very low temperature. For example, in an actual test, a 350 H.P. motor was operated at 108 percent of its normal rating, while the maximum winding temperatures, as measured in the stator core, did not exceed about 120° F. Maintaining this relatively low temperature drastically reduces the rate of deterioration of the motor insulation and thereby extends the normal service life of the motor.

Another advantage of the present invention is that if the coolant supply is accidentally cut off, the end turns of the stator windings will heat up more rapidly than the windings in the stator core. Since the overtemperature motor protectors are normally located at the stator end turns, the protectors quickly sense the overheated condition and open the circuit before damage can occur. The rapid response of the motor protectors thus offers an extra margin of protection. Moreover, the system is so effective that no coolant need be introduced into the gap between the rotor and stator, thereby minimizing windage losses from this effect.

It is, therefore, a principal object of the invention to provide an improved cooling system for dynamo-electric devices, particularly a system adapted for use in conjunction with hermetically sealed motors operating in a refrigerant environment.

Another object of the invention is to provide a cooling system in which the coolant is distributed more uniformly in areas which are potential sources of overheating conditions.

Still another object of the invention is to provide a motor cooling ssytem in which certain critical parts are prevented from overheating, while still permitting the operation of the motor protectors if the supply of coolant is accidentially interrupted.

Additional objects and advantages will be apparent from the following detailed description taken in conjunction with the drawings wherein:

FIGURE 1 is a cross sectional view of a motor-compressor assembly constructed in accordance with the principles of the present invention;

FIGURE 2 is a cross sectional view taken along the plane of line 2—2 of FIGURE 1; and FIGURE 3 is a partial isometric view of a portion of the side wall of the housing adjacent the stator illustrating the jacketed section provided around the central portion thereof.

Referring first to FIGURE 1, the dynamoelectric device is shown as taking the form of a hermetically sealed electric motor incorporated in a compressor drive assembly; but it should be understood that this is just an example of various applications for which the invention is suitable. The motor A is of the induction type and is arranged within a housing B. Motor A is operatively connected to a shaft C which drives a compressor impeller D through speed increasing gearing E (optional). The housing B includes a generally cylindrical main body 10 and an end cover 12 which is provided with a journal bearing 14 for one end of the rotor shaft. The opposite end of the rotor shaft is supported by a bulkhead 16 and is journaled in a second shaft bearing 18.

The motor A is of a conventional design and includes a stator 20 having an annular core member 22 and windings 24 extending axially from opposite ends of said core member. The rotor 26, arranged internally of the stator, includes cylindrical core 28 and end rings 30. The core is mounted on the central portion of the shaft C and is secured thereto by keying, splining or other suitable means. To avoid unnecessary detail, the connections for the power supply, the winding leads, etc., are not shown in the drawing.

As best shown in FIGURE 1, the rotor shaft C is provided with an elongated axially extending passage 32 through which the liquid coolant flows to a series of circumferentially spaced nozzles or jets 34 located just outboard of the rotor end surfaces. The coolant is supplied to passage 32 through a conduit 36 which is connected to a cup-shaped cover 38 enclosing the end of the rotor shaft and communicating with passage 32. Other suitable means may be used to introduce the coolant into passage 32 from outside the housing.

An important feature of the invention is best shown in FIGURES 2 and 3. It will be noted that the external diameter of stator core 22 is less than the internal diameter of the central housing section 10. This provides an annular space for a jacket which is defined by fluid confining means on both sides of the center line and at the lower region thereof. In one preferred embodiment, these fluid confining means take the form of U-shaped ribs 40, 41 (FIGURE 3) which may be cast within the housing. It should be apparent, however, that they may also be attached, such as by welding, to inside of the housing, or, alternatively, may be associated with the exterior of the stator core, either integrally cast or welded in like manner. As shown, each of the U-shaped ribs has a pair of circumferentially extending segments 43 and an axially extending segment 44 near the lower portion of the housing. The circumferentially extending segments 43 of each rib terminate near the upper end of the core and thereby provide openings or fluid passages 46 which communicate with the space in which the stator winding end turns are located. When the jacketed spaces, generally indicated by numeral 50, are supplied with coolant through ports 51, 52 (FIGURE 2) the coolant will flow upwardly along the outside of the stator core and then spill out through the openings 46 over the stator end turns which are outside the confines of the jackets.

A sump 54 for collecting the coolant is located in the lower portion of the housing and is connected to a drain line 56. If the coolant is a liquid refrigerant, it is normally supplied to ports 51, 52 from the refrigeration system condenser and returned through drain line 56 to the evaporator. As the refrigerant contacts the motor surfaces, much of it vaporizes so the coolant passing out through drain line 56 is a mixture of liquid and vapor.

If the supply of coolant is discontinued for any reason, for example by clogging of the feed lines, the jets spraying the inner surface of the motor windings will stop and the coolant being supplied to the jacket will stop spilling over the ends of the windings. With the motor continuing to run, the outer end turns of the windings begin to heat up so that the temperature sensors 60 embedded in the windings will eventually cut off the current supplied to the motor. In the meantime, the central section of the stator is still in contact with a body of coolant surrounding the periphery of the stator core. This residual coolant is able to absorb a relatively large amount of heat to prevent damage to the motor. In the case of a refrigerant compresser, where the coolant supplied would preferably be liquid refrigerant from the condenser, the refrigerant will vaporize, absorbing heat; and the vaporized refrigerant will be permitted to pass through the openings 46 at the upper ends of the jackets.

While this invention has been described in connection with a certain specific embodiment thereof, it is to be understood that this is by way of illustration and not by way of limitation; and the scope of the appended claim should be construed as broadly as the prior art will permit.

What is claimed is:

1. An electric motor assembly comprising a housing; an electric motor supported in said housing, said motor including an annular stator having a core and winding end turns extending axially from said core, and an internally disposed, generally cylindrical rotor having end faces; a shaft operatively connected to and driven by said rotor; an annular space defined between the external surface of said stator core and the internal surface of said housing; a pair of generally U-shaped ribs in said space providing a pair of oppositely disposed recessed areas along a substantial portion of said stator core, said recesses adapted to contain a fluid in heat exchange relation with said stator core thereby forming a cooling jacket, the upper end of said jacket being open and in fluid communication with portions of said winding end turns outside the confines of said jacket; means defining a fluid passage internally of said rotor shaft; a plurality of nozzles extending radially from said rotor shaft and communicating with said fluid passage, said nozzles beign located within said housing and positioned to direct a liquid coolant along the internal surfaces of said stator winding end turns; and means for supplying a liquid coolant to said fluid passage and to said jacket, whereby the fluid supplied to said jacket is directed to flow upwardly over the external surface of said stator core and spill out over the upper portions of said winding end turns.

References Cited

FOREIGN PATENTS 883,827  6/1968  Great Britain.

WARREN E. RAY, *Primary Examiner.*

R. SKUDY, *Assistant Examiner.*

U.S. Cl. X.R.

310—54